United States Patent [19]

Modeen et al.

[11] Patent Number: 5,938,401

[45] Date of Patent: Aug. 17, 1999

[54] AUTOMATIC ENGINE HYDRO-MECHANICAL CONTROL UNIT PREFLIGHT TEST

[75] Inventors: Douglas P. Modeen, Granby; Christopher E. Paul, West Hartford, both of Conn.; Kristin M. Devlin, East Sandwich, Mass.

[73] Assignee: United Technologies Corporation, Windsor Locks, Conn.

[21] Appl. No.: 09/018,020

[22] Filed: Feb. 3, 1998

[51] Int. Cl.[6] ............................. F01D 17/26; F01D 17/20
[52] U.S. Cl. ................................. 415/36; 415/17; 415/36; 415/42; 415/48; 415/49; 415/50; 415/16; 415/118; 73/118.2; 73/1.79
[58] Field of Search .................................. 415/17, 36, 42, 415/48, 49, 50, 16, 118; 73/118.2, 1.79

[56] References Cited

U.S. PATENT DOCUMENTS 4,279,568   7/1981  Munroe ..................................... 415/17
4,610,599   9/1986  Long ........................................ 415/15

Primary Examiner—F. Daniel Lopez
Assistant Examiner—Rhonda Barton

[57] ABSTRACT

A method of testing an actuation system for positioning an inlet guide vane, the actuation system including a primary electronic system, a secondary hydro-mechanical system is disclosed. The method includes the steps of controlling the position of the inlet guide vane with the primary system from an start engine speed up to a first engine speed; transferring control of the position of the inlet guide vane from the primary system to the secondary system at said first engine speed; controlling the position of the inlet guide vane with the secondary system from the first engine speed up to a second engine speed; obtaining a monitored position of the inlet guide vane with the primary system from said first speed to said second speed; indicating a failed status if the monitored position obtained by the primary system does not correspond to a predicted position; and transferring control from the secondary system to the primary system for the engine speeds of said second speed or greater, in absence of said failed status.

7 Claims, 4 Drawing Sheets

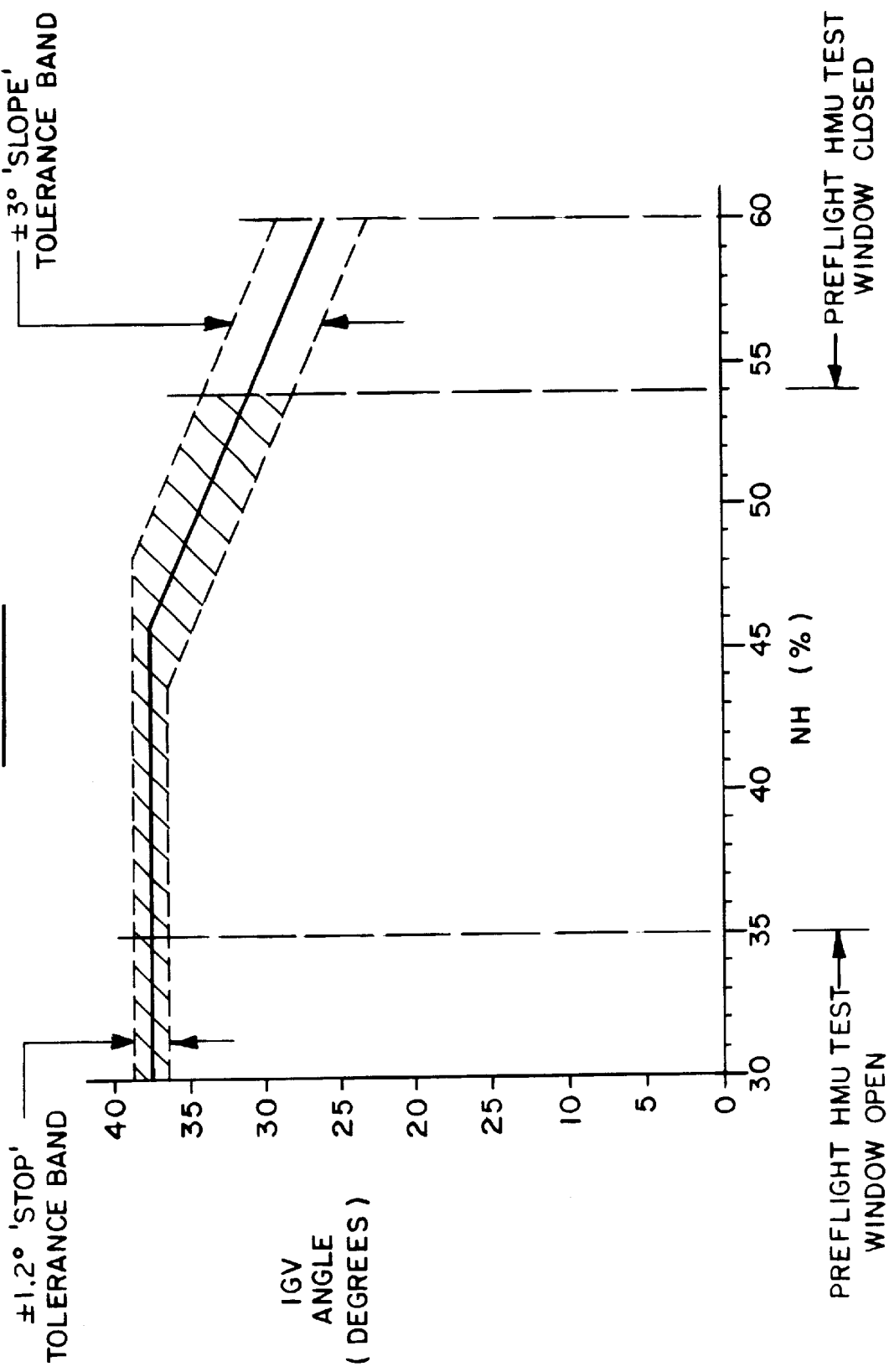

AUTOMATIC ENGINE HYDRO-MECHANICAL CONTROL UNIT PREFLIGHT TEST

TECHNICAL FIELD

This invention is directed to a control system for verifying the proper operation of aircraft engine/surface actuator controls, and more particularly, to a control system for verifying the proper operation of a control associated with the inlet guide vanes of an aircraft engine.

BACKGROUND ART

Preflight tests are conducted on aircraft engine subsystems prior to takeoff to verify their operation. An example of such a subsystem includes the inlet guide vanes control subsystem including the associated controller and actuator therefore.

Conventionally, preflight tests are performed to exercise the subsystem under predetermined conditions to ensure the subsystem's proper functionality for flight conditions. In such tests, the subsystem performance is monitored by various diagnostics and/or by a human observer on the ground and the pilot. Tests are typically conducted in sequence, which results in an increased pilot workload and increased aircraft ground time. For obvious reasons, both of these results translate into higher operational costs of the aircraft and specifically the aircraft engine.

More specifically, for some modern aircraft, the inlet guide vane control system (IGVCS) has a dual lane architecture comprised of an electronic primary lane an a hydro-mechanical secondary lane. The hydro-mechanical secondary lane serves as a back-up in the event of an electronic primary lane failure. The IGVCS controls the inlet guide vane position as a function of engine speed adjusted for air inlet temperature.

The primary electronic and secondary hydro-mechanical lanes have similar characteristics and each lane's characteristics must be verified individually before takeoff to ensure a fully operational system for a successful flight. The backup hydro-mechanical system control functionality is tested on power up by the pilot, in conjunction with the primary lane processor, by conducting a preflight test which ensures the hydro-mechanical lane's full operational capability. The current method requires significant input by the pilot.

There exists a need, therefore, for an actuator control test system, which test system is independent of operator intervention.

DISCLOSURE OF INVENTION

The primary object of this invention is to provide an improved system for testing engine subsystems.

Another object of this invention is to provide an improved system for testing aircraft engine subsystems, which operates independently of operator input.

Another object of this invention is to provide a system for testing the performance of an inlet guide vane subsystem of an aircraft engine, which test system verifies the transfer from the primary lane to the secondary lane.

Still another object of this invention is to provide an inlet guide vane subsystem controller test system for testing the inlet guide vane subsystem of an aircraft engine, which test system verifies the operation of the secondary lane for changes in engine speed.

And still another object of this invention is to provide an engine subsystem test method for testing engine subsystems such as inlet guide vane subsystems, which test system tests the controller of the subsystem while involving no pilot intervention.

The foregoing objects and following advantages are achieved by the automated test method of the present invention for transferring control of the inlet guide vane (IGV) from the primary lane to the secondary lane over a definitized range of engine speeds upon engine start.

The method includes the steps of initializing the primary system upon engine start; controlling the position of the IGV from engine start up to a first speed, via the primary system; transferring control from the primary lane to the secondary lane for engine speeds at or greater than the first speed through a second speed; monitoring IGV position, as controlled by the secondary lane, through the primary lane to ensure the secondary lane is functioning; and transferring control back to the primary lane for engine speeds greater than a second speed.

In a preferred embodiment, the system is an inlet guide vane subsystem including an actuator and control for which the method of the present invention is used to test performance.

BRIEF DESCRIPTION OF THE DRAWINGS

FIG. 5 is a graphical representation of the test tolerance band for the various test steps shown in FIG. 4.

BEST MODE FOR CARRYING OUT THE INVENTION

Figure 1:
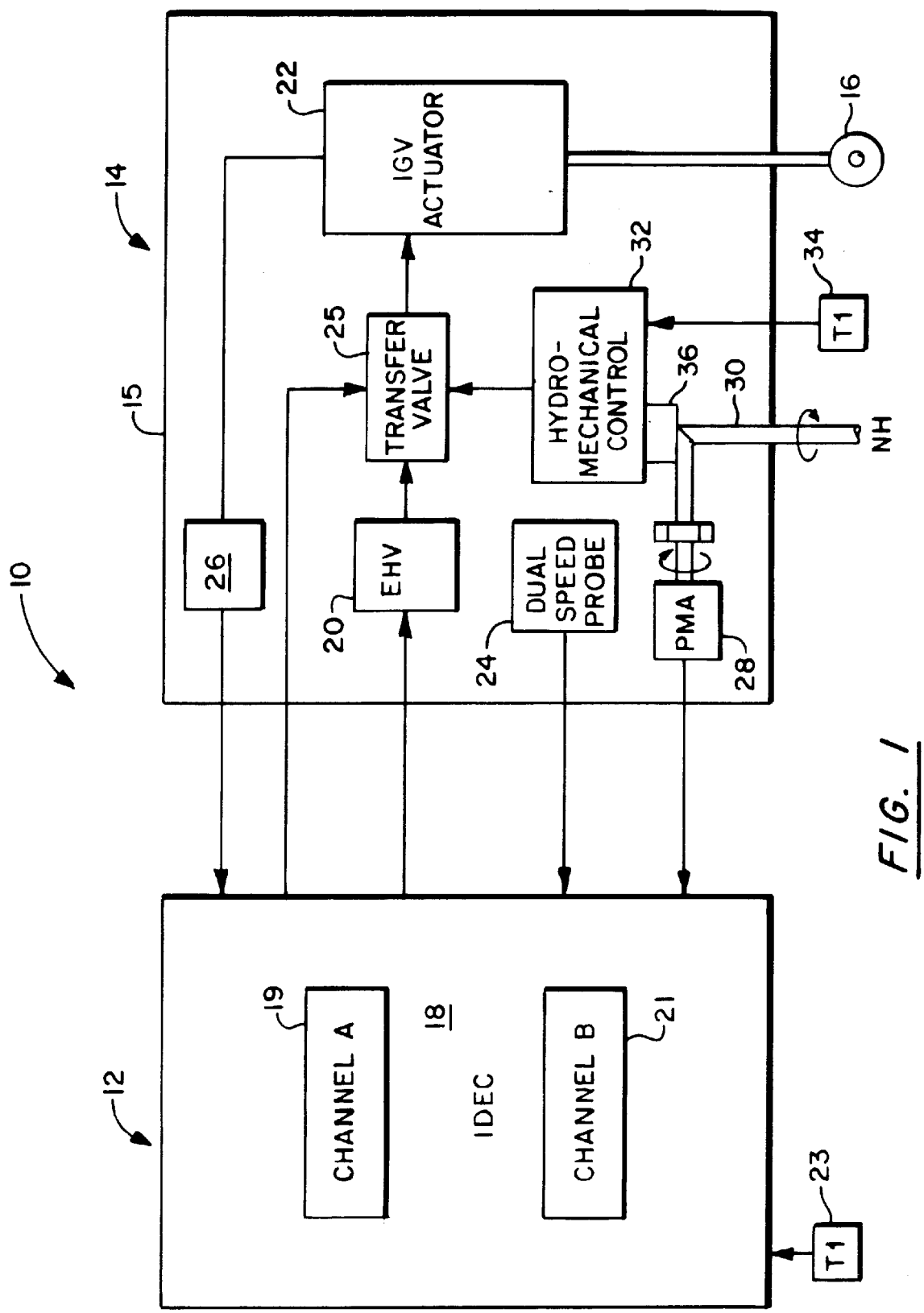
FIG. 1 is a schematic diagram of one system with which the method of the present invention is used.

Referring now to the drawings in detail, there is shown in FIG. 1, a schematic diagram of one system with which the method of the present invention is used, designated generally as 10. System 10 includes a primary electronic lane 12, hereinafter primary lane, and a secondary hydro-mechanical lane 14, hereinafter secondary lane, used for controlling the position of inlet guide vanes (IGV) 16 of an engine (not shown).

The primary lane 12 includes the IGV digital electronic control (IDEC) 18, which consists of redundant channels A and B 19, 21, and a portion of the hydro-mechanical unit (HMU) 15. The HMU 15 provides hydraulic force actuation for IGV 16 positioning during primary lane 12 operation and both control and actuation during secondary hydro-mechanical control lane 14 operation. The method of the present invention verifies that the secondary hydro-mechanical control lane 14, transfer valve 25 and electro-hydraulic servo valve 20 is functioning properly prior to flight operation.

The primary lane 12 consists of an inlet guide vane digital electronic control (IDEC) 18, electro-hydraulic servo valve 20 to command IGV 16 position via IGV position actuator 22. The primary lane 12 schedules IGV 16 position as a function of engine speed (NH) corrected for engine inlet air temperature (T1). Temperature at the engine inlet is provided by RTD probe 23 while engine speed is provided by magnetic speed sensor 24, sensing the speed of shaft 30 which is driven by the engine.

The transfer valve 25 is responsive to a command from the primary lane 12 for selecting whether the primary lane 12 or secondary hydro-mechanical control lane 14 controls IGV 16 position. In addition, an IGV position actuator 22 provides IGV 16 position feedback to the primary lane 16. Finally, a permanent magnet alternator (PMA) 28, located in the HMU 15, provides power to the IDEC 18. The PMA 28 is driven by shaft 30.

Figure 2:
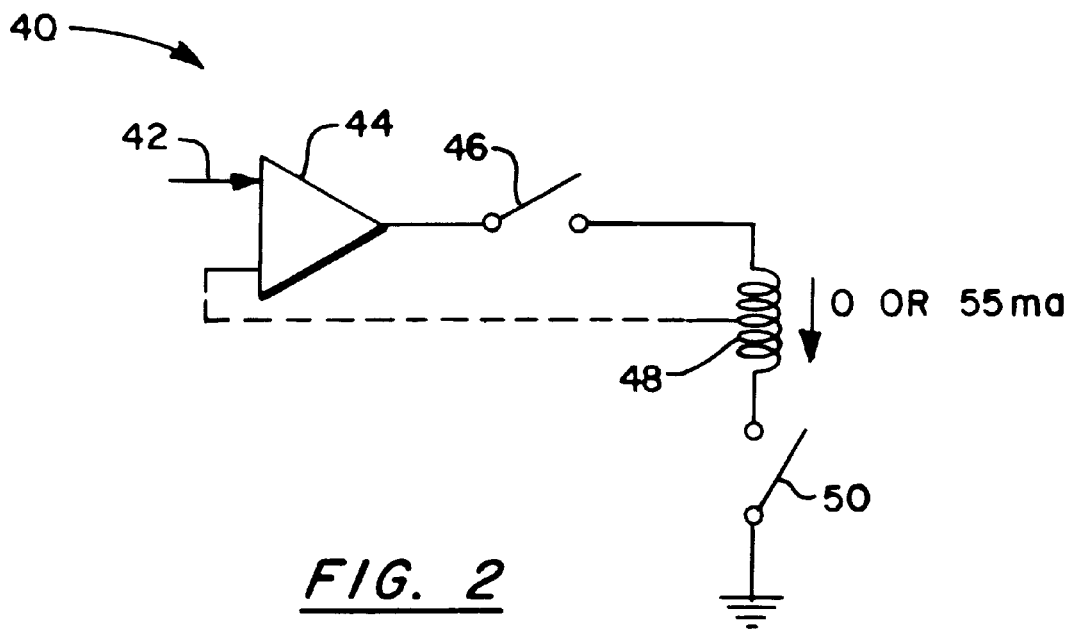
FIG. 2 is an electrical schematic diagram of a typical transfer valve.
Figure 3:
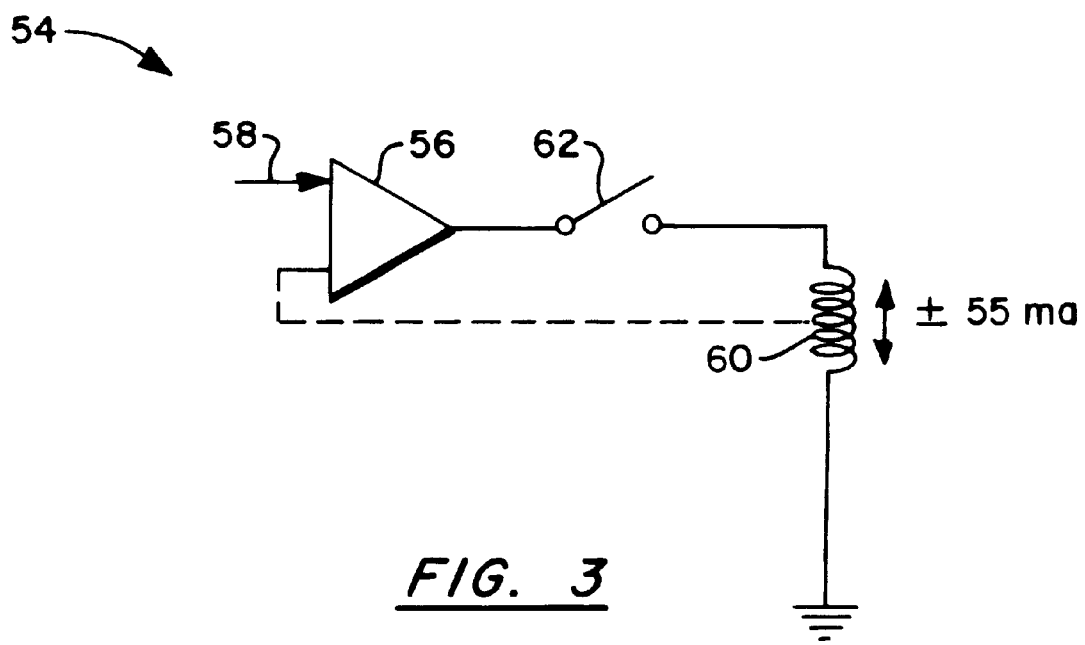
FIG. 3 is an electrical schematic diagram of a typical electro-hydraulic valve.

The transfer control valve 25, and the electro-hydraulic servo valve 20 are shown schematically in FIGS. 2 and 3 respectively. Both are dual torque motor designs, only one channel of which is shown.

The transfer control valve electronic control 40 (FIG. 2) consists of a 55 mA current drive 44 which is responsive to a signal 42 received from the IDEC 18. In addition the IDEC 18 must close high side switch 46 and low side switch 50 in order to provide the 55 mA current to coil 48. If there is a failure in either switch 46, 50 the coil will be de-energized and control of the IGV 16 will be transferred to the secondary hydro-mechanical lane 15.

The electro-hydraulic control valve electronic control 54 (FIG. 3) modulates the current through coil 60 to control the position of the IGV 16. The current drive 56 is responsive to signal 58, received from IDEC 18, for providing a modulated current to coil 60. In addition the IDEC 18 must close the high side switch 62 to energize the coil 60.

In operation, channel A 19 will close high side switch 46 and low side switch 50 to energize coil 48. By energizing the transfer valve 25 the primary lane 12 will now control IGV 16 position. Energizing the electro-hydraulic valve 20 positions IGV angle.

The secondary hydro-mechanical control lane 14 comprises a hydro-mechanical control 32 which in combination with IGV actuator 22 provides hydraulic force actuation for positioning of the inlet guide vane 16 during the secondary hydro-mechanical control lane 14 operation. Secondary hydro-mechanical control lane 14 senses engine air inlet temperature via a liquid bulb temperature device 34 and engine speed via a flyball actuator 36, which is driven by shaft 30. The secondary hydro-mechanical control lane 14 continually schedules inlet guide vane position during operation and control by the primary electronic 12 lane so as to maintain readiness to take control of system 10 in the event of primary lane 12 failure. However, secondary hydro-mechanical control lane 14 remains isolated from IGV actuator 22 until power is removed from the transfer valve 25 due to a failure in the primary lane 12 or the primary lane 12 commands a switch to the secondary hydro-mechanical control lane 14.

The IDEC 18 of the primary electronic lane 12 has two operational channels and starts up automatically upon rotation of shaft 30 which causes PMA 28 to provide power to the IDEC 18. The IDEC 18 takes control of system 10 by powering up either of the redundant channels 19 or 21 and providing an electrical signal to the transfer control valve 25. The dual channel architecture operates in an active/standby mode such that one channel is active and the other is in standby. If a failure occurs in one of the channels, an automatic transfer to the standby channel is made. In the case where both channels fail, or if a fault is detected which cannot be isolated to either channel, control is automatically transferred to the secondary hydro-mechanical control lane 14 by removal of power or by command to the transfer control valve 25.

Accordingly, if there is a failure of the primary lane 12 the secondary hydro-mechanical control lane 14 must be operating properly in order to control the IGV 16. Therefore operation of the secondary hydro-mechanical control lane 14 must be verified before takeoff to ensure a fully operational system for successful flight.

Figure 4:
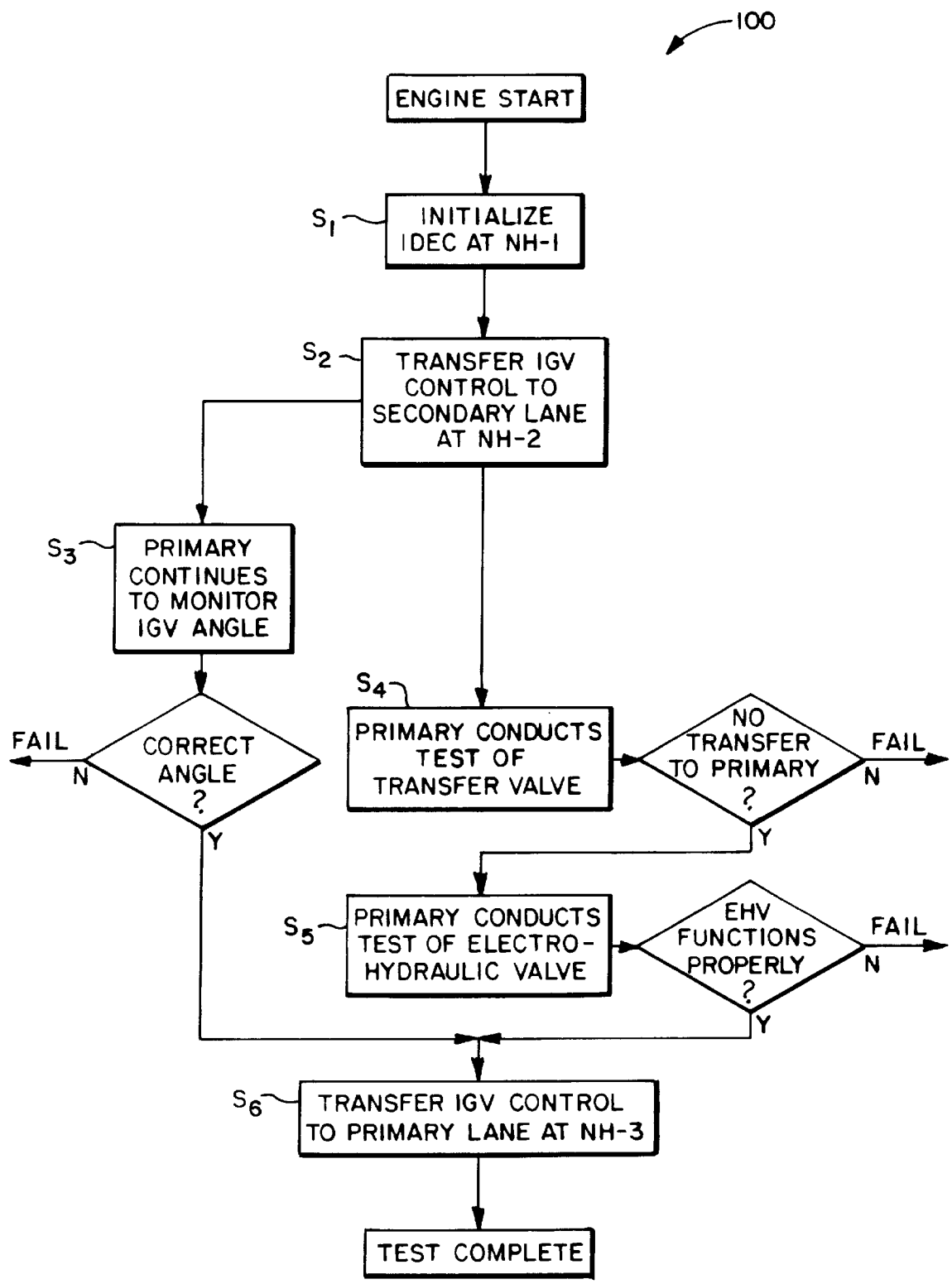
FIG. 4 is a flowchart of the subject method.

The method of the present invention is performed as part of the normal start up of the engine. The method 100 is illustrated in the flow chart of FIG. 4. As the engine starts shaft 30, shown in FIG. 1 rotates in response to engine rotation. At an engine speed of approximately 23.75% of full speed the PMA 28 will provide power to the IDEC 18 and the IDEC 18 will initialize as shown in S1. Channel A 19 or channel B 21 will begin to control IGV 16. For the discussions here it is assumed that channel A 19 is controlling. Therefore, channel A will energize the appropriate coils of the transfer valve 25 and electro-hydraulic valve 20 to place the primary lane in control of the IGV 16 and set the IGV 16 to an angle 37.5°. At a speed equal to 31.25% of full speed, IDEC 18 initialization is complete.

As shown in S2, the IDEC transfers control of the IGV 16 to the secondary hydro-mechanical control lane 14 for test thereof at a speed of approximately 35%. The primary lane 12 will continue to monitor the angle of the IGV 16 approximately every 6 msec, as illustrated in S3, during control by the secondary hydro-mechanical control lane 14, to ensure that the secondary hydro-mechanical control lane 14 is operating properly. The measured angle must fall within an expected bandwidth as shown in FIG. 5. The bandwidth of FIG. 5 is needed to prevent a false error indication.

The tests described in the following paragraphs and represented by S4 and S5 will also be performed by the primary lane 12 while the secondary lane is controlling IGV angle.

As shown in S4, the primary lane 12 will test the transfer valve by opening and closing the high and low side switches 46, 50 of coil 48 to ensure that the switches and coil are functioning properly. The primary lane commands the, high side switch 46 of transfer valve 25 closed while the low side switch 50 remains open and checks to ensure that control of the IGV 16 remains with the secondary hydro-mechanical control lane 14. If control is transferred to the primary lane 12, the primary lane 12 indicates a transfer valve fault.

The primary lane then commands low side switch 50 of the transfer valve 25 closed while the high side switch 46 remains open Again control of the IGV 16 should remain with the secondary hydro-mechanical control lane 14. If control is transferred to the primary lane 12, the primary lane 12 indicates a transfer valve 25 fault.

The primary lane then commands the transfer valve 25, low side switch 50 open while the high side switch 46 remains open Control of the IGV 16 should again, remain with the secondary hydro-mechanical control lane 14. If control is transferred to the primary lane 12, the primary lane 12 indicates a transfer valve fault.

As shown in S5, the primary lane 12 commands the electro-hydraulic valve 20 to position the IGV 16 to an angle different from the IGV angle being commanded by the secondary hydro-mechanical control lane 14. If IGV 16 moves to the angle commanded by the primary lane 12, the primary lane 12 indicates a transfer valve 25 fault. The primary lane also checks the voltages across electro-hydraulic valve windings to ensure high side switch 62 and coil 60 are functioning properly.

The above tests are repeated for channel B 21. The above tests are completed at a speed of 54% at which point control of the IGV angle is transferred to the primary lane 12 and normal operation is resumed.

The primary advantage of this invention is that an improved system is provided for testing engine subsystems.

Another advantage of this invention is that an improved system is provided for testing aircraft engine subsystems, which system performs independent of operator input.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A method of testing an actuation system for positioning an inlet guide vane, the actuation system including a primary system, a secondary system, and a means for selecting the primary and secondary system, the primary and secondary system being responsive to an inlet temperature and an engine speed for setting a position of the inlet guide vane, the method comprising:

controlling the position of the inlet guide vane with the primary system from a start engine speed up to a first engine speed;

transferring control of the position of the inlet guide vane from the primary system to the secondary system at said first engine speed, via the selecting means;

controlling the position of the inlet guide vane with the secondary system from said first engine speed up to a second engine speed;

obtaining a monitored position of the inlet guide vane with the primary system from said first speed to said second speed;

indicating a failed status if the monitored position obtained by the primary system does not correspond to a predicted position;

transferring control from the secondary system to the primary system for the engine speeds of said second speed or greater, in absence of said failed status.

2. The method of claim 1, wherein the secondary system is controlling the position of the inlet guide vane, further comprising the step of:

commanding the position of the inlet guide vane to a second position via the primary system;

indicating a selecting means failure if said monitored position corresponds to said second position.

3. The method of claim 1 wherein said predicted position corresponds to an acceptable range of positions.

4. A method of testing an actuation system for positioning an inlet guide vane, the actuation system including a primary system, a secondary system, a primary actuation means responsive to the primary system, a secondary actuation means responsive to the secondary system, and a means for coupling the primary or secondary actuation means to the inlet guide vane for positioning the inlet guide vane, the primary and secondary system being responsive to an inlet temperature and an engine speed for setting a position of the inlet guide vane, the method comprising:

controlling the position of the inlet guide vane with the primary system from an start engine speed up to a first engine speed;

transferring control of the position of the inlet guide vane from the primary system to the secondary system at said first engine speed, via the coupling means;

setting a first position signal for the inlet guide vane with the secondary system from said first engine speed up to a second engine speed;

positioning the inlet guide with the secondary actuation means in response to said position signal;

obtaining a monitored position of the inlet guide vane with the primary system from said first speed to said second speed;

indicating a failed status if the monitored position obtained by the primary system does not correspond to a predicted position;

transferring control from the secondary system to the primary system for the engine speeds of said second speed or greater, in absence of said failed status.

5. The method of claim 4, wherein the secondary actuation means is positioning the inlet guide vane, further comprising the step of:

setting a second position signal for the inlet guide vane corresponding to a second position via the primary system;

indicating a selecting means failure if said monitored position corresponds to said second position.

6. The method of claim 4 wherein said predicted position corresponds to an acceptable range of positions.

7. The method of claim 5 further comprising the steps of:

monitoring the primary actuation means with the primary system and;

indicating a primary actuation means failure if the primary actuation means fails to respond to said second position signal.

* * * * *